United States Patent
Kao et al.

(10) Patent No.: US 9,069,581 B2
(45) Date of Patent: Jun. 30, 2015

(54) METHOD AND SYSTEM FOR PARAMETER CONFIGURATION

(75) Inventors: Sheng Liang Kao, New Taipei (TW);
Tse Hsine Liao, New Taipei (TW); Chih Hua Ke, New Taipei (TW); Wan Chen Wang, New Taipei (TW); Yen Chu Lu, New Taipei (TW); Jih Ping Chi, New Taipei (TW); Chieh Fu Chung, New Taipei (TW); Te Hung Chen, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 456 days.

(21) Appl. No.: 13/589,724

(22) Filed: Aug. 20, 2012

(65) Prior Publication Data
US 2013/0047121 A1 Feb. 21, 2013

Related U.S. Application Data

(60) Provisional application No. 61/525,194, filed on Aug. 19, 2011.

(51) Int. Cl.
*G06F 1/00* (2006.01)
*G06F 9/445* (2006.01)
(Continued)

(52) U.S. Cl.
CPC .......... *G06F 9/44505* (2013.01); *G06F 3/0482* (2013.01); *G06F 2203/04802* (2013.01); *G06F 3/04847* (2013.01)

(58) Field of Classification Search
CPC .................. G06F 2203/04802; G06F 3/04082; G06F 9/44505; G06F 3/0482; G06F 3/04847
See application file for complete search history.

(56) References Cited

U.S. PATENT DOCUMENTS 5,923,324 A 7/1999 Berry et al.
2009/0241067 A1* 9/2009 Dubs et al. .................... 715/850

FOREIGN PATENT DOCUMENTS

GB 2425700 A 11/2006
JP 07-114451 A 5/1995
(Continued)

OTHER PUBLICATIONS

BoneDancr, H50 Temperature problem in new board, part2, Mar. 17, 2010, http://forum.corsair.com/v3/showthread.php?t=85874, BoneDancr's motherboard pitcure in the comment posted at 3:57pm.*

(Continued)

*Primary Examiner* — Jaweed A Abbaszadeh
*Assistant Examiner* — Austin Hicks
(74) *Attorney, Agent, or Firm* — Chun-Ming Shih

(57) ABSTRACT

A system for parameter configuration includes a display unit, a storage unit, and a processing unit, in which a basic input and output system (BIOS) and a parameter setting interface are stored in the storage unit. The parameter setting interface includes a two-dimensional (2D) screen, a three-dimensional (3D) icon and plural parameter setting menus. A method for parameter configuration includes executing the BIOS and calling the parameter setting interface using the processing unit; displaying the 2D screen on the display unit; displaying 3D icon on the 2D screen; selecting one of object images of the 3D icon; displaying a parameter setting menu corresponding to the selected object image on the 2D screen; and adjusting parameter values of the BIOS using the corresponding parameter setting menu. The invention provides an easy and convenient operation for the user because setup parameters of the BIOS can be set intuitively.

27 Claims, 18 Drawing Sheets

(51) Int. Cl.
*G06F 3/0482* (2013.01)
*G06F 3/0484* (2013.01)

(56) References Cited

FOREIGN PATENT DOCUMENTS

| JP | 11-134156 A | 5/1999 |
| JP | 2007041727 A | 2/2007 |
| JP | 2008524732 A | 7/2008 |
| JP | 2009271864 A | 11/2009 |
| JP | 2010-55166 A | 3/2010 |

OTHER PUBLICATIONS

Guru3D.com, Guru3D ASUS SaberTooth P67 uEFI BIOS Footage, Jan. 4, 2011, https://www.youtube.com/watch?v=YL1gyndwfs4.*

* cited by examiner

METHOD AND SYSTEM FOR PARAMETER CONFIGURATION

CROSS-REFERENCE TO RELATED APPLICATIONS

This application claims the benefit of the filing date priority of U.S. Provisional Application No. 61/525,194, filed on Aug. 19, 2011, the disclosure of which is incorporated herein by reference in its entirety.

BACKGROUND OF THE INVENTION

1. Field of the Invention

The invention relates to a method and system for setting parameters of a computer system; more particularly, to a method and system for setting parameters of a basic input and output system (BIOS).

2. Description of the Prior Art

Generally, a human-machine interface, such as an interface for setting parameters of a basic input/output system (known as "BIOS") of a computer system, is usually installed in the computer system to execute application programs or setup parameters of the computer system by way of a windowized screen. The BIOS is a setting interface built-in a motherboard of the computer system for controlling basic operations of hardwares of the computer system. With BIOS, the operating system of the computer and its applications are freed from having to understand exact details (such as hardware addresses) about the attached input/output devices. Whenever device details change, the BIOS program needs to be changed, which can sometimes be achieved during the system setup.

On setting the parameters of the BIOS, a configuration interface such as a setup window or graphic user interface (known as "GUI") in two-dimensional (written as "2D" hereinafter) mode is usually shown on a display unit of the computer system to facilitate the user's operation. In addition, several option items such as standard CMOS setup, BIOS features setup, chipset features setup, power management setup, load BIOS defaults, load optimum settings, user password setup and the like, are provided by the configuration interface for the user to change the settings with an input device (like mouse or keyboard).

However, since the windowized configuration interface or GUI of the BIOS is generally presented on the display unit of the computer system in 2D mode and in English, and some technical terms therein may be difficult for the user, it often takes a hard time in setting the parameters of the computer system successfully. In particular to the novice at the computer, a complicated setting interface usually causes great inconvenience and difficulty in usage and will not become popular in modern society.

Hence, there is a need to provide a humanity operation interface characterized by an intuitive and easy-to-understand operating environment for the user.

SUMMARY OF THE INVENTION

In view of the above, the present invention provides a method and system for parameter configuration that can solve all the aforementioned problems in prior art.

The present invention discloses a method for parameter configuration that is adapted to a system for parameter configuration. The method for parameter configuration includes: executing a basic input and output system (BIOS) of the system for parameter configuration and calling a parameter setting interface from a storage unit by a processing unit; displaying a two-dimensional (2D) screen of the parameter setting interface on a display unit of the system for parameter configuration; displaying a three-dimensional (3D) icon of the parameter setting interface on the 2D screen, wherein the 3D icon is defined by an x-axis, a y-axis, and a z-axis intersecting at a point and includes a plurality of object images; selecting one of the plurality of the object images of the 3D icon; displaying a parameter setting menu linked to one of a plurality of setup options of the BIOS on the 2D screen of the parameter setting interface; and adjusting a parameter values of the related setup option of the BIOS through the parameter setting menu of the parameter setting interface.

The present invention also discloses a system for parameter configuration comprising a storage unit, a display unit and a processing unit. A basic input and output system (BIOS) having a plurality of setup options and a parameter setting interface having a 2D screen, a 3D icon, and a plurality of parameter setting menus are stored in the storage unit. The 3D icon is arranged on the 2D screen, defined by an x-axis, a y-axis, and a z-axis intersecting at a point, and includes a plurality of object images. The plurality of the parameter setting menus correspond to the plurality of the object images respectively and are linked to the plurality of the setup options of the BIOS. When one of the plurality of the object images is selected, one of the plurality of the parameter setting menus corresponding to the selected object image is displayed on the 2D screen and superimposed on the 3D icon. The display unit of the system for parameter configuration is electrically connected to the processing unit for displaying the parameter setting interface. The processing unit is electrically connected to the storage unit for executing the BIOS, and calling and displaying the parameter setting interface on the display unit.

The effect of the present invention is achieved in the following way. The object image corresponding to the selected parameter setting menu is presented through 3D icon of the parameter setting interface so as to be understood easily by the user by 3D visual perception. The user can select the object images as desired intuitively to open the relative parameter setting menus and set the parameters related to the computer system such as BIOS parameter or power management of a central processing unit (CPU). As a result, it becomes more convenient and efficient for the user to set the parameters of the computer system.

The characteristics, realization and functions of the invention are disclosed in the following description with reference to the preferred exemplified embodiments and the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

Figure 1:
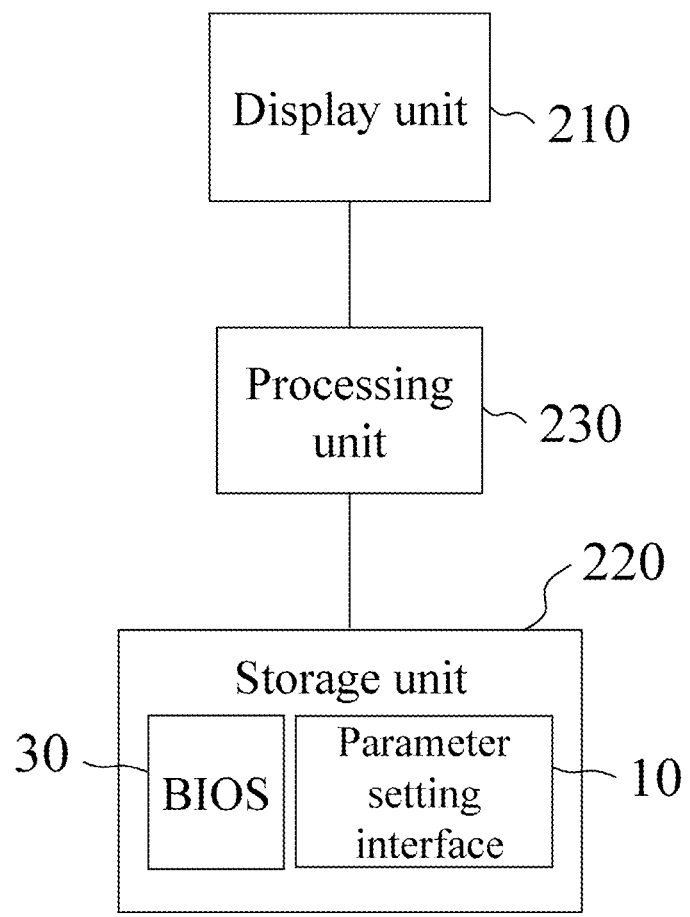
FIG. 1 is a diagram of a system for parameter configuration according to a first embodiment of the present invention.

Referring to FIGS. 1-4, a system 20 for parameter configuration of a first embodiment of the present invention is adapted to a computer apparatus for adjusting and setting a basic input and output system (BIOS) 30 installed in the computer apparatus. The system 20 for parameter configuration includes a display unit 210, a storage unit 220 where the BIOS 30 and a parameter setting interface 10 are stored and a processing unit 230. An active screen of the parameter setting interface 10 is represented on the display unit 210 for the user to setup or adjust parameter values of the BIOS 30. Moreover, the display unit 210 of the system 20 for parameter configuration may, for example, a touch panel or a liquid crystal panel. That is, in the operation of parameter setup or adjustment, the user may touch the touch panel directly or make use of an input device like a mouse or keyboard. The processing unit 230 is connected to the display unit 210 and the storage unit 220 respectively for executing the BIOS 30 together with calling and displaying the parameter setting interface 10 on the display unit 210.

The parameter setting interface 10 of the first embodiment of the present invention comprises a two-dimensional (2D) screen 110, a three-dimensional (3D) icon 120 and a plurality of parameter setting menus 130, and the 2D screen 110 of the parameter setting interface 10 is displayed on the display unit 210 of the system 20 for parameter configuration.

The 3D icon 120 including a plurality of object images 121 is arranged on the 2D screen 110 and defined by an x-axis X, a y-axis Y, and a z-axis Z intersecting at a point O. Each of the object images 121 represents a 3D graph of an electronic device inside the computer apparatus or a 3D graph of the computer apparatus. For example, the object image 121 may represent a 3D graph of a motherboard with a plurality of electronic elements, or a 3D graph of a computer apparatus having therein a chassis and electronic devices such as a hard disk, motherboard, fan module, power supply, cable and the like. In this embodiment, the object images 121 represent the 3D graphs of the electronic elements on a motherboard, and this is for illustration only rather than limitation.

The object images 121 include a circuit board image 122 arranged between the x-axis X and z-axis Z defining the 3D icon 120. In other words, the circuit board image 122 is shown on the plane defined with x and z axes of the 3D icon 120. A plurality of electronic element images 123 are distributed between the x-axis X and the z-axis Z of the 3D icon 120 and superimposed on the circuit board image 122 along the y-axis of the 3D icon 120. The electronic element images 123 correspond to electronic elements on the motherboard respectively, such as a central process unit (CPU), memory slot and connection port. In this way, the parameter setting interface is represented on the display unit 210 in the form of a stereoscopic unified extensible firmware interface (UEFI).

The plurality of the parameter setting menus 130 of the parameter setting interface 10 are linked to a plurality of setup options of the BIOS 30 and the plurality of the object images 121 of the 3D icon 120 respectively for displaying (arranging) one of the plurality of the parameter setting menus 130 linked to the selected object image 121 on the 2D screen 110.

Referring to FIGS. 2, 5, 6 and 7, the parameter setting interface 10 of the first embodiment further comprises a cursor 140, a switch icon 150, and/or a plurality of message prompt windows 160, which are optionally arranged on the 2D screen 110. The cursor 140 is capable of moving on the 2D screen 110 for the user to select or click objects arranged on the 2D screen 110. The switch icon 150 linked to the 3D icon 120 and arranged on the 2D screen 110 is used to rotate the 3D icon 120 around the x-axis X, y-axis Y or z-axis Z. The plurality of the message prompt windows 160 are linked to the plurality of the object images 121 of the 3D icon respectively, and when one of the object images 121 is selected, one of the message prompt windows 160 corresponding to the selected object image 121 is displayed on the 2D screen 110.

As mention above, it can be understood that when a display unit like a touch panel is involved, the user can touch, select or rotate the object on the touch panel directly without using the cursor. So the cursor and the switch icon can be omitted from the parameter setting interface.

Figure 2:
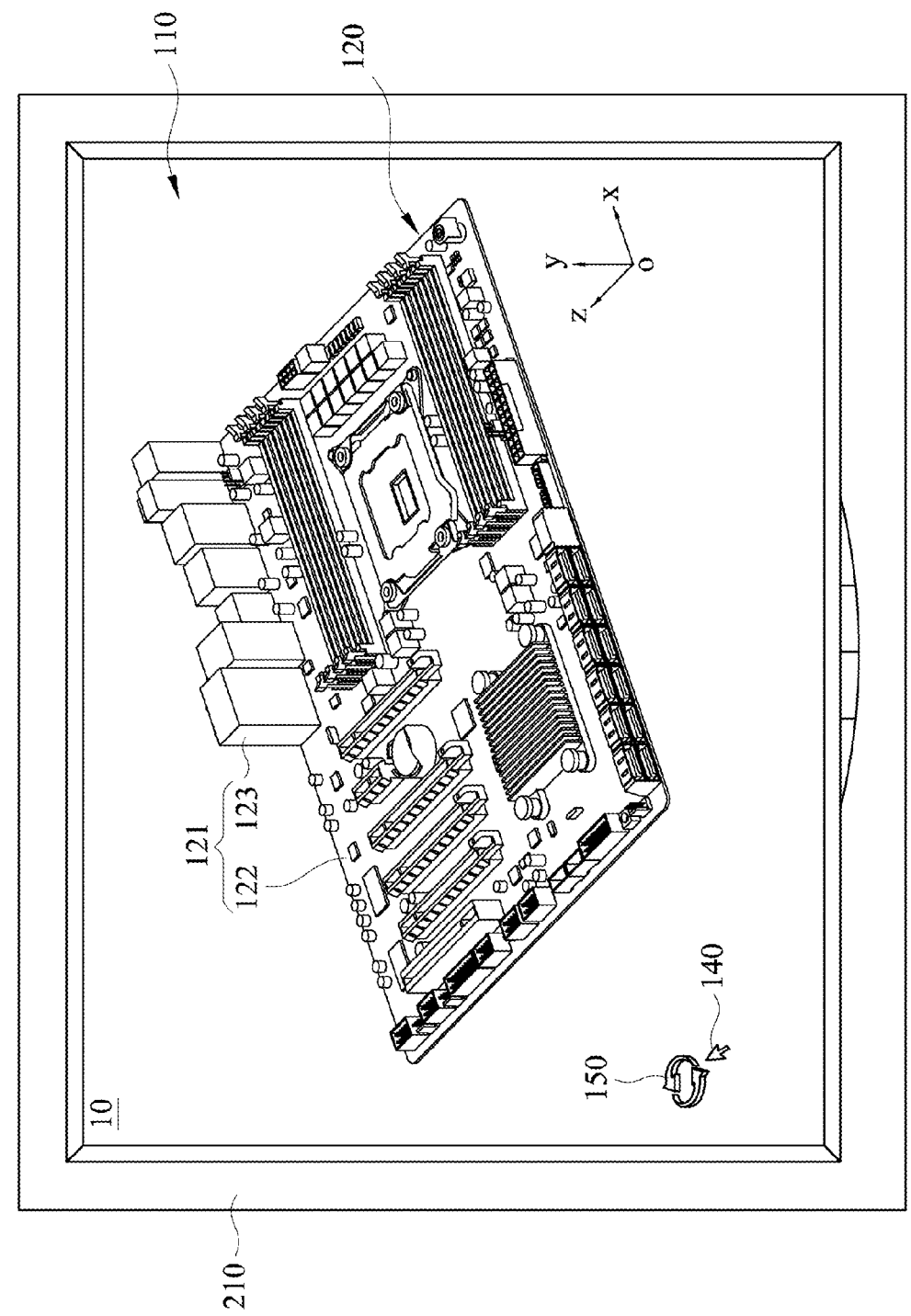
FIGS. 2-7 are exemplary state diagrams for using the system for parameter configuration to setup parameters according to the first embodiment of the present invention.
Figure 3:
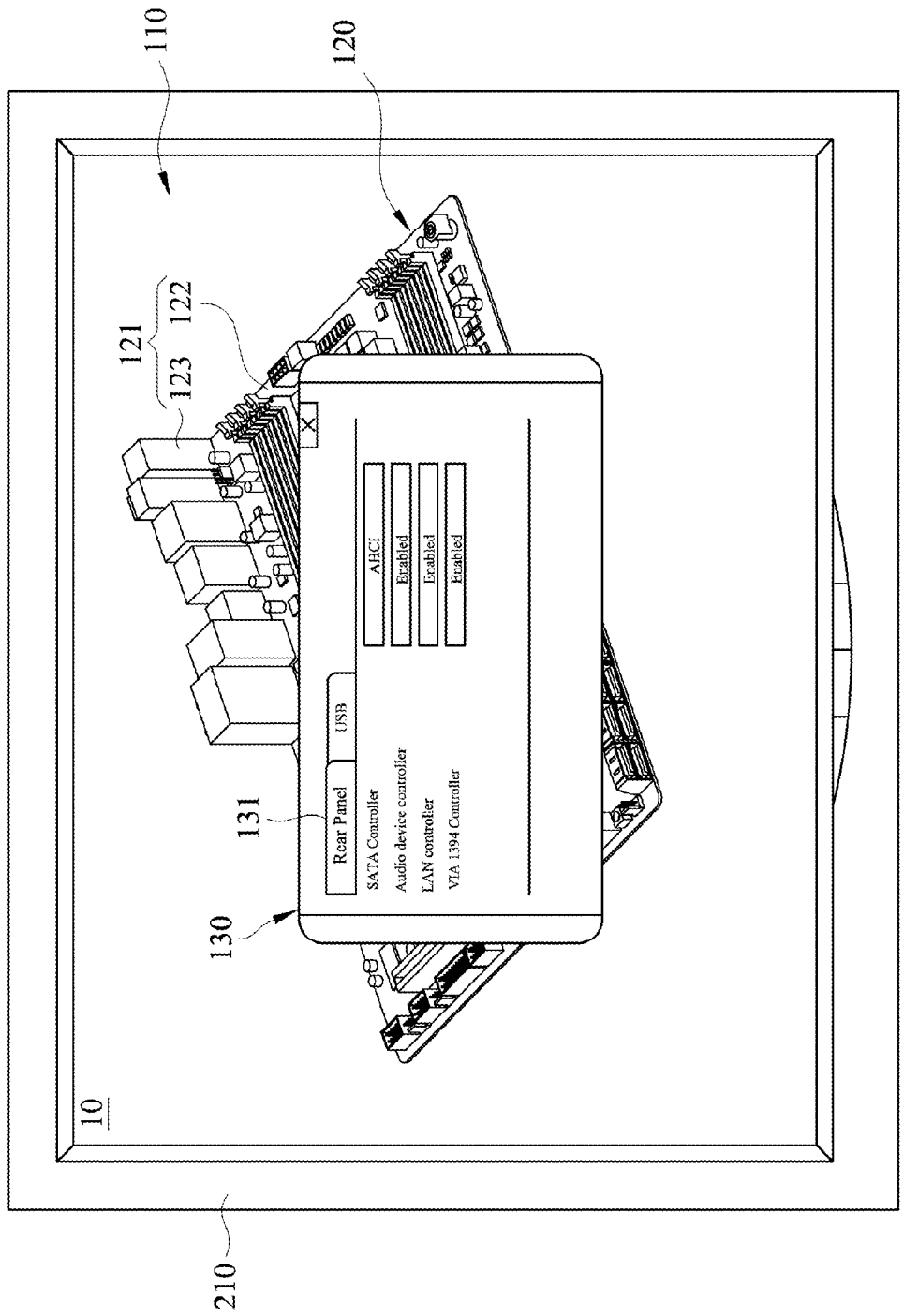
Figure 4:
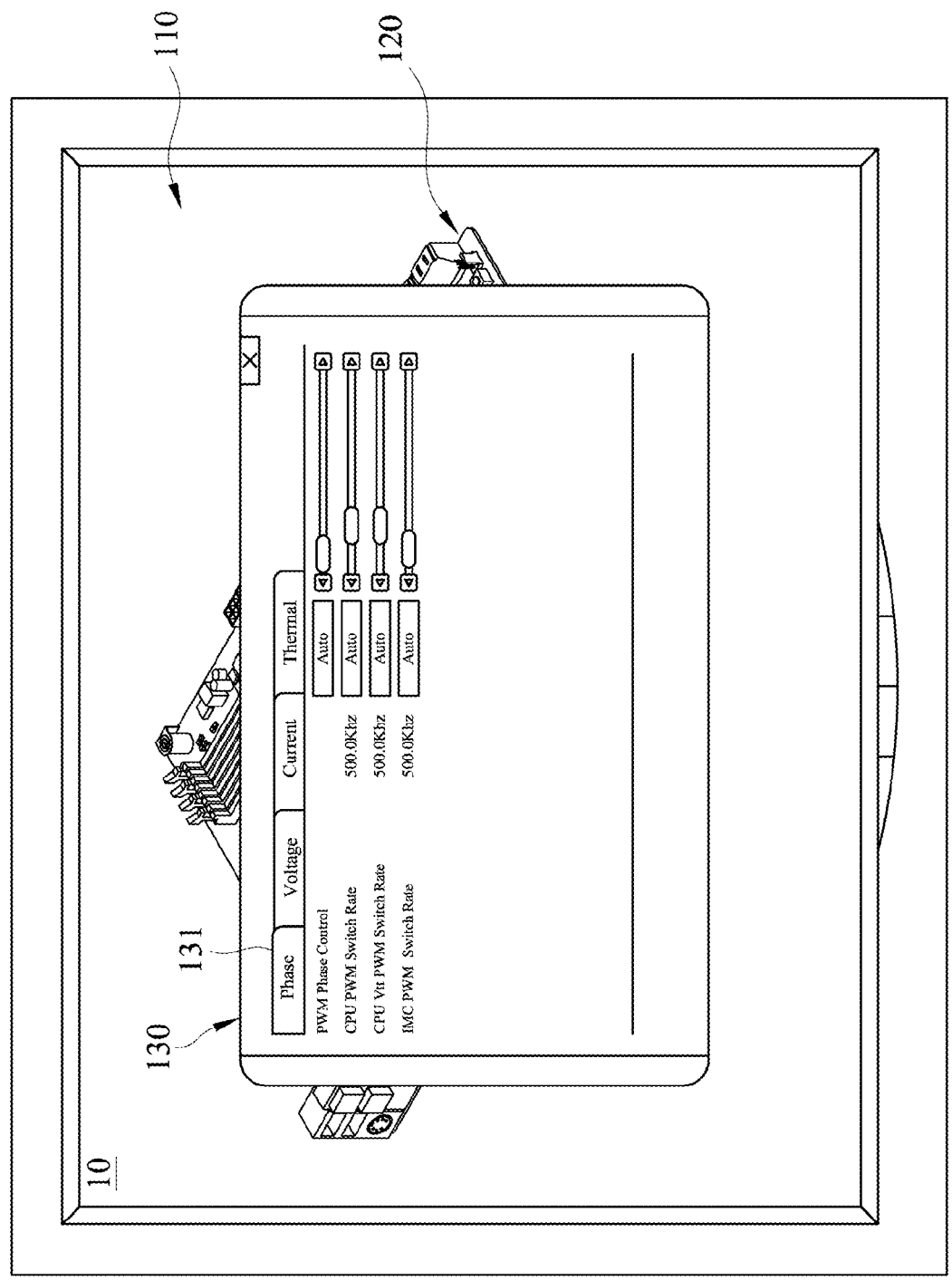
Figure 5:
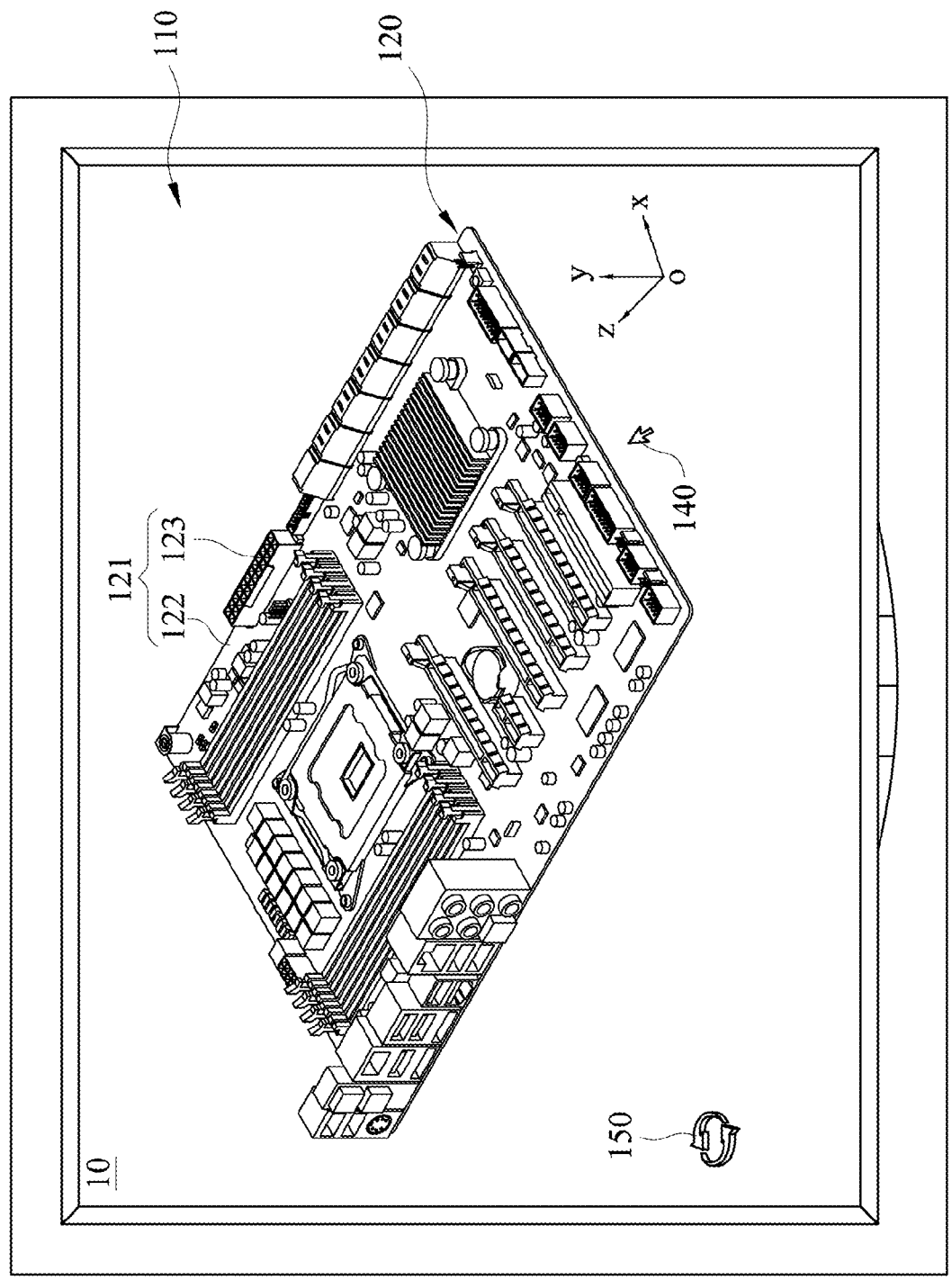
Figure 6:
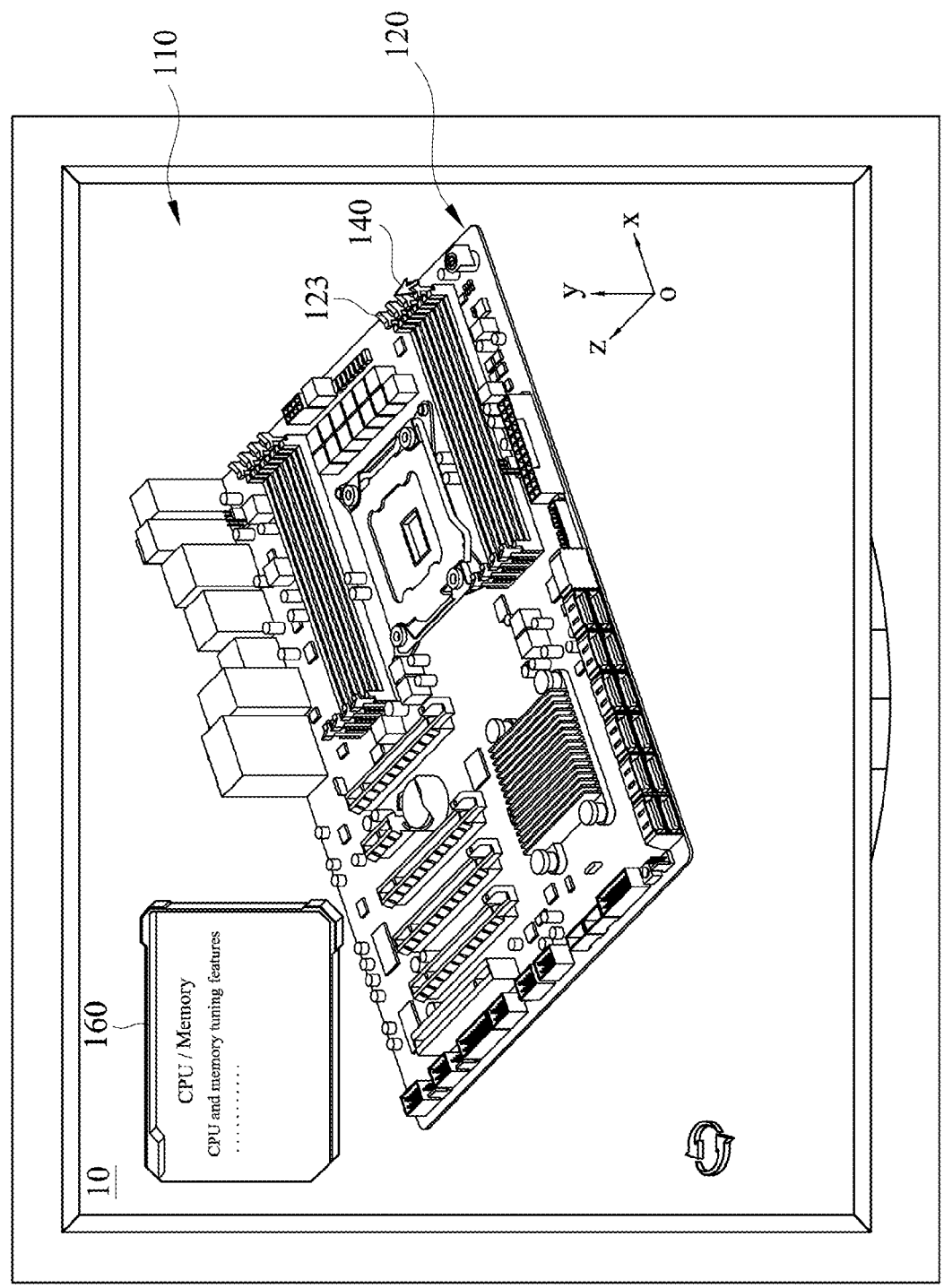
Figure 7:
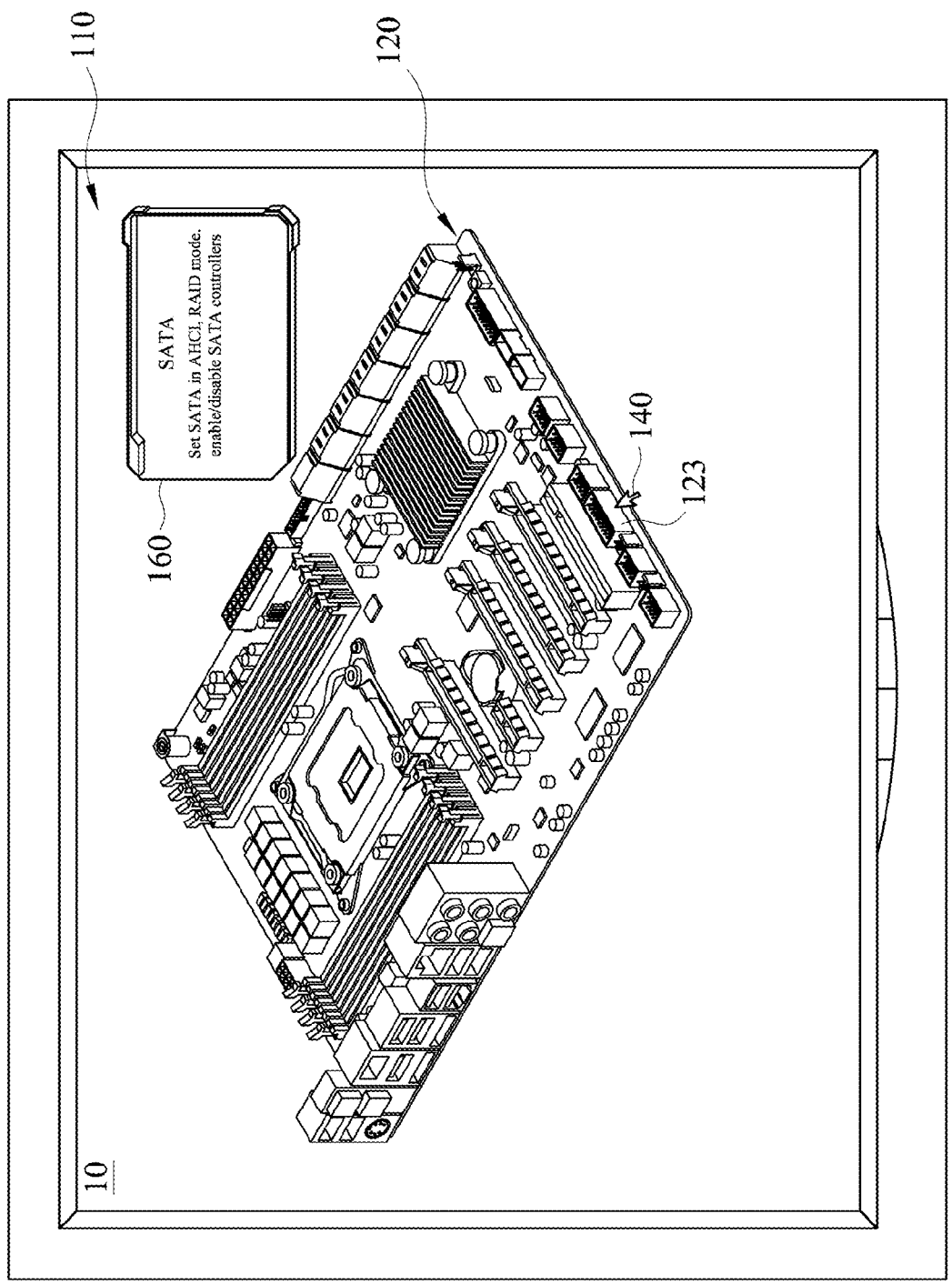
Figure 8:
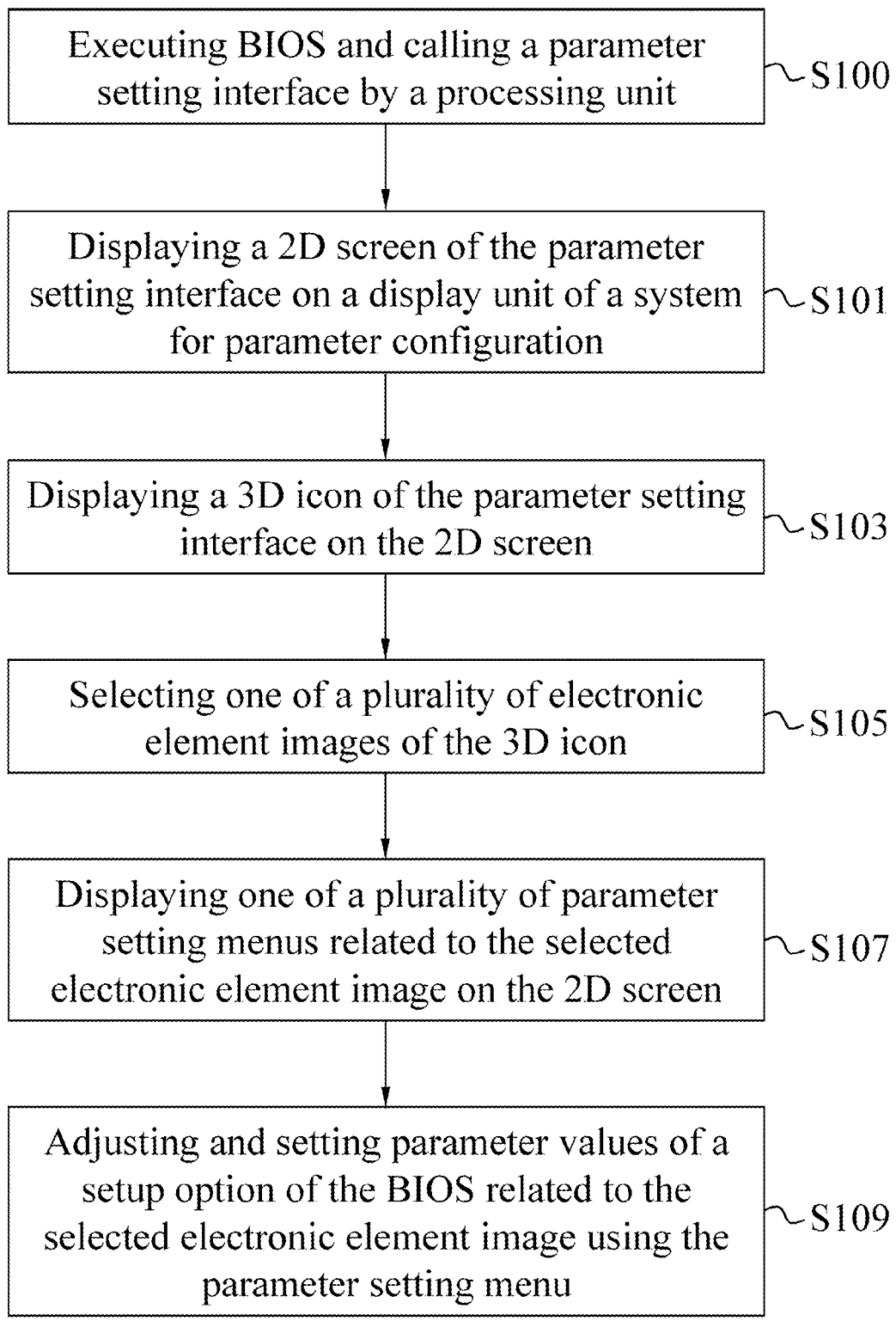
FIG. 8 is a flowchart of a method for parameter configuration according to the first embodiment of the present invention.

Referring to FIGS. 1-8, in operation, when the computer apparatus is powered on, firstly, the BIOS 30 is executed and the parameter setting interface 10 is called by the processing unit 230 (S100), and then, the 2D screen 110 of the parameter setting interface 10 is displayed on the display unit 210 of the system for parameter configuration 20 (S101). Then, the 3D icon 120 is displayed on the 2D screen 110 (S103), wherein the circuit board image 122 is shown on the plane defined with x and -z of the 3D icon 120, and the plurality of the electronic element images 123 are superimposed on the circuit board image 122 along the y-axis of the 3D icon 120 for the user to preview the 3D graph of the electronic device which is desired to setup parameter values through the parameter setting interface 10. Next, the 3D icon 120 may be dragged or the switch icon 150 may be clicked with the cursor 140 for viewing the 3D icon 120 from a desired visual angle, as shown in FIGS. 2 and 5. In addition, the user may also be removed the cursor 140 to the 3D icon 120 and overlapped on one of the plurality of the electronic element images 123 optionally, meanwhile, one of the plurality of the message prompt window 160 corresponding to the selected electronic element image 123 is pop-up on the 2D screen 110 or superimposed on the 3D icon 120. Therefore, as shown in FIGS. 6-7, the user can realize immediately the parameter setting of the BIOS corresponding to the selected electronic element image 123 by way of the message prompt window 160.

After that, one of the plurality of the electronic element images 123 is selected using the cursor 140 (S105). For example, continuously click the electronic element images 123 twice, for displaying one of the plurality of the parameter setting menus 130 corresponding to the selected electronic element image 123 on the 2D screen 110 (S107), as shown in FIGS. 3-4, the parameter setting menu 130 may be, but not limited to, overlapped on the 3D icon 120, and the parameter setting menu 130 comprises several parameter setting items 131 which are corresponding to the plurality of the electronic element images 123. Finally, the user can adjust (or modify) and setup parameter values of the setup options of the BIOS 30 that is related to the selected electronic element image 123 as desired through the parameter setting items 131 of the parameter setting menu 130 (S109).

Based on the above, the parameter setting interface provides an intuitive operation interface for the user to set parameter values of the BIOS. The user can realize that the object of the BIOS corresponds to which component of the electronic device immediately, since the 3D icon of the parameter setting interface of the present invention illustrates the electronic device of the computer system. Besides, the parameter settings of the BIOS may be set and adjusted by selecting the corresponding electronic element image.

Figure 9:
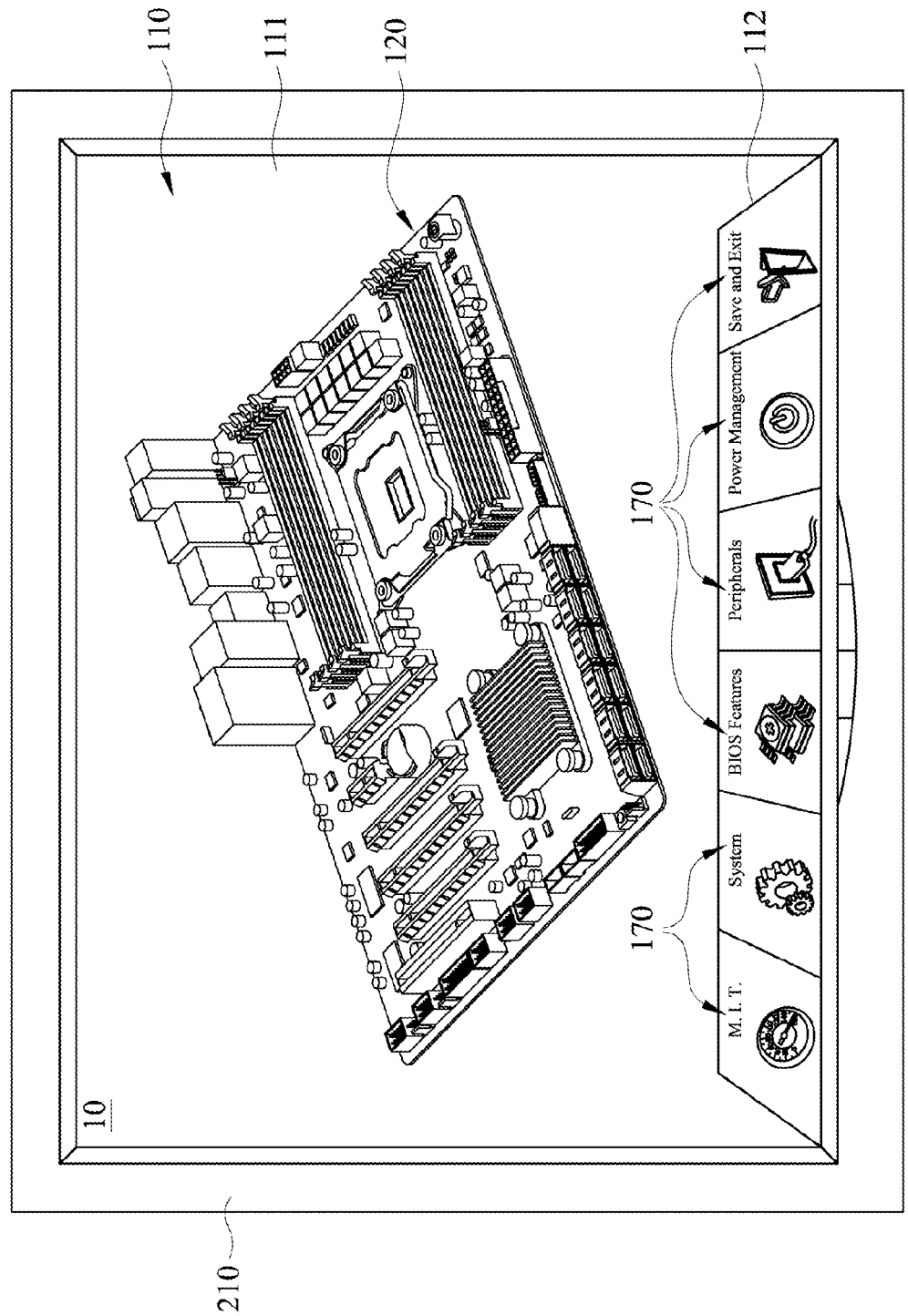
FIGS. 9-10 are exemplary state diagrams for using a system for parameter configuration to setup parameters according to a second embodiment of the present invention.
Figure 10:
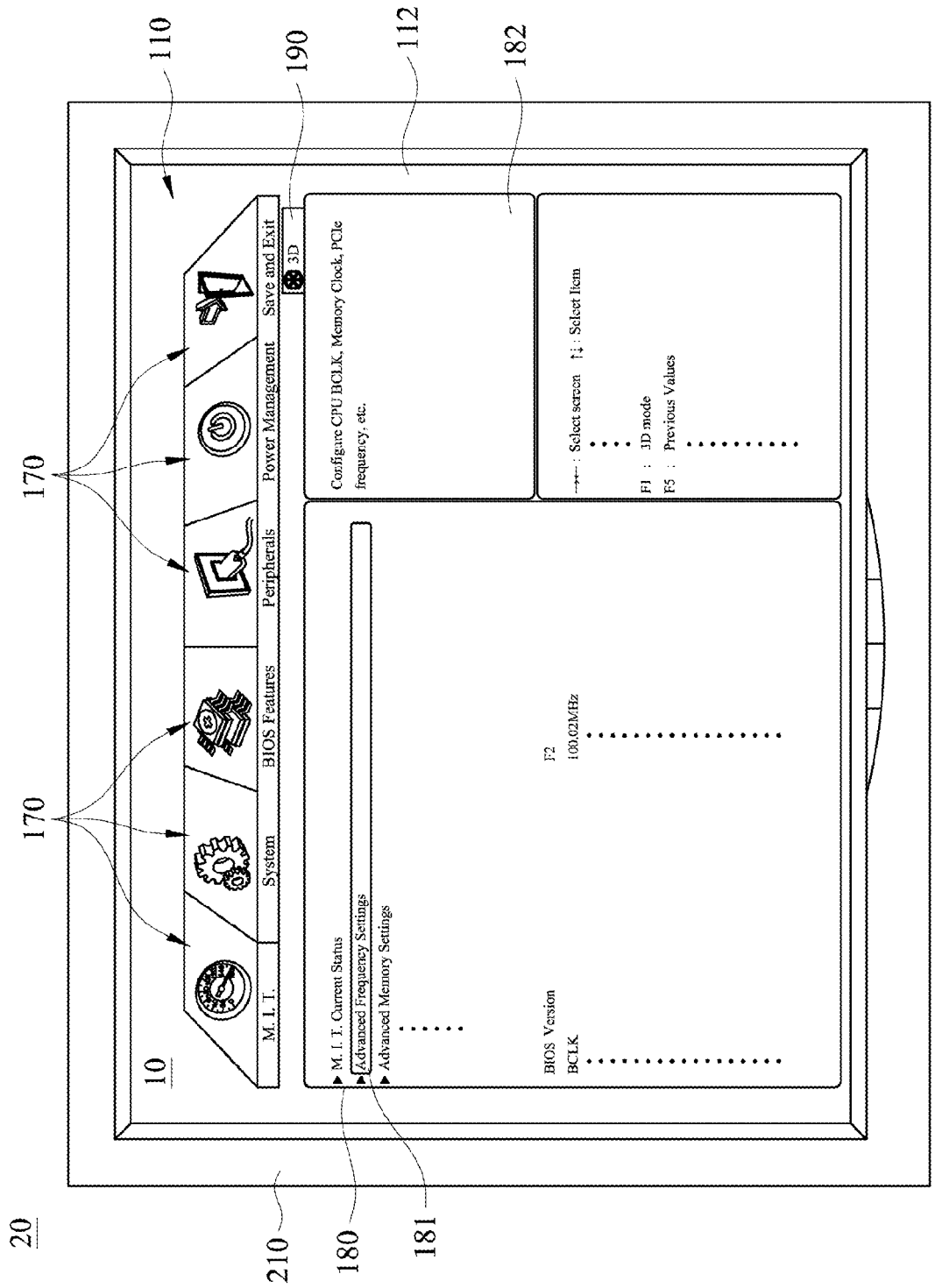

Referring to FIGS. 9 and 10, which are an exemplary state diagram for using the system for parameter configuration to setup parameters according to a second embodiment of the present invention.

The parameter setting interface 10 of the second embodiment is similar to that of the first embodiment except that the parameter setting interface 10 of the second embodiment further comprises a plurality of guide icon 170 and a plurality of function menus 180, and the 2D screen 110 includes a first layer 111 and a second layer 112, and the 3D icon 120 is arranged on the first layer 112 of the 2D screen 110.

The plurality of the guide icons 170 is arranged on the first layer 111 or the second layer 112 of the 2D screen 110 optionally, wherein when the plurality of the guide icons 170 are arranged on the first layer 111 of the 2D screen 110, the first layer 111 covers the second layer 112 of the 2D screen 110 normally; and when the plurality of the guide icons 170 are arranged on the second layer 112 of the 2D screen 110, the second layer 112 overlaps on one side of the first layer 111 in the initial state for representing the plurality of the guide icon 170 and the 3D icon 120 on the 2D screen 110 simultaneously. In this embodiment, the plurality of the guide icon 170 are arranged on the second layer 112 of the 2D screen for illustration only rather than limitation, wherein the plurality of guide icon 170 are arranged on the second layer 112 of the 2D screen 110, and respectively linked to the plurality of the setup options of the BIOS 30 such as MB Intelligent Tweaker (M.I.T.) setup option, system features setup option, BIOS features setup option, peripheral devices setup option, power management setup option, or save and exit setup option . . . etc., for providing a GUI to the user to setting BIOS related parameter values conveniently.

The plurality of the function menus 180 are linked to the plurality of the setup options of the BIOS 30 and the plurality of the guide icons 170 respectively, and when one of the guide icons 170 is selected, one of the function menus 180 corresponding to the selected guide icons 170 is displayed on the second layer 112 optionally and covers the first layer 111 of the 2D screen 110.

Therefore, in the second embodiment of the present invention, the user can not adjust and setup the parameter values related to the BIOS through the 3D icon 120 only, but also by the plurality of the guide icons 170 and function menus 180 of the parameter setting interface 10.

Figure 11:
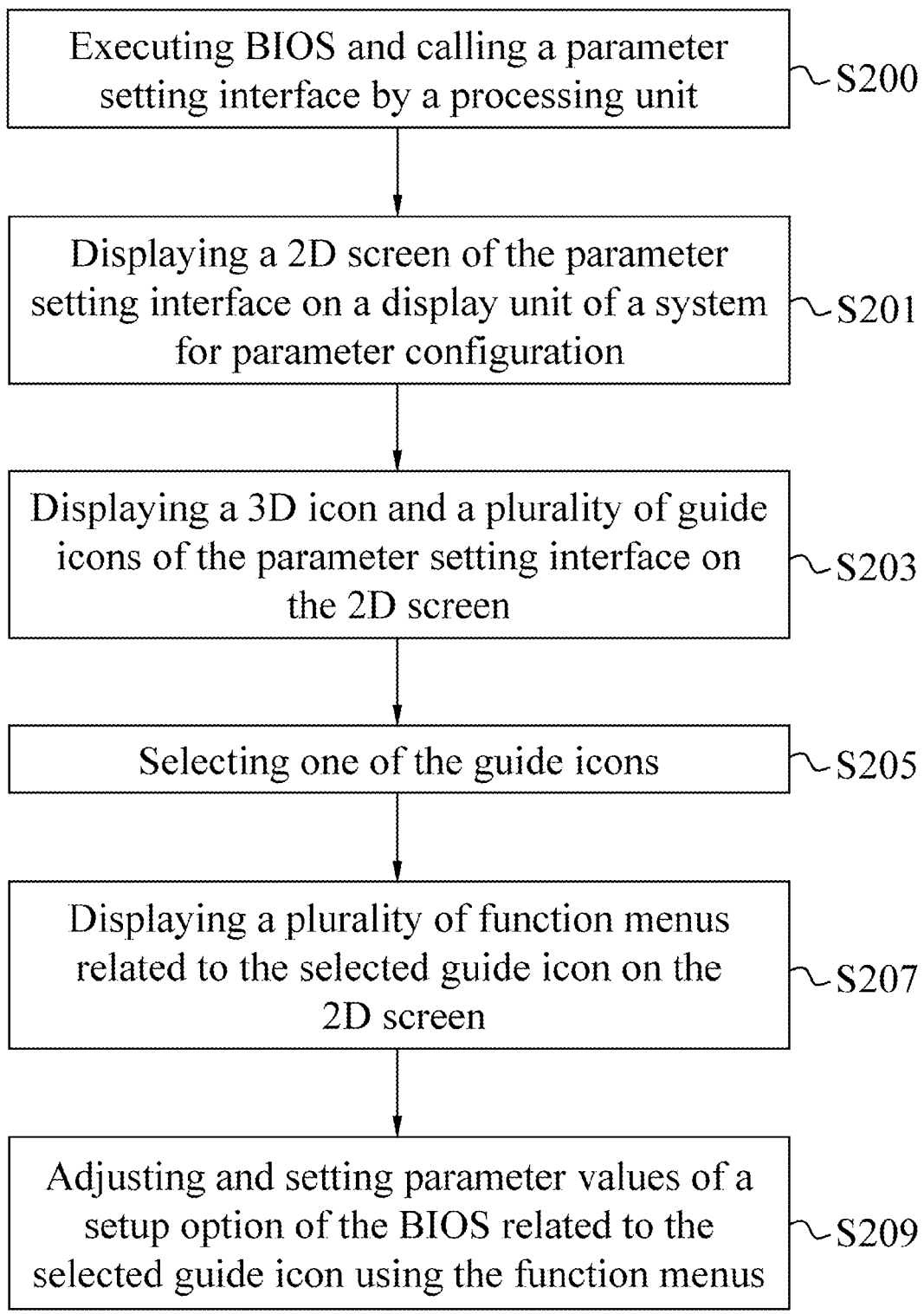
FIG. 11 is a flowchart of a method for parameter configuration according to the second embodiment of the present invention.

Referring to FIGS. 9-11, a method for parameter configuration of the second embodiment of the present invention is similar to that of the first embodiment except that the 3D icon 120 is displayed on the first layer 111 of the 2D screen 110 and the plurality of the guide icons 170 are displayed on the second layer 112 of the 2D screen 110 (S203), after the step of displaying the 2D screen 110 of the parameter setting interface 10 on the display unit 210 of the system 20 for parameter configuration (S201). Then, one of the plurality of the guide icons 170 on the 2D screen 110 is selected (S205), and when one of the guide icons 170 is selected, the second layer 112 of the 2D screen 110 is displaced with respect to the first layer 111 and covers the first layer 111 (as shown in FIG. 10). In the meantime, one of the plurality of the function menus 180 corresponding to the selected guide icon 170 is displayed on the second layer 112 (S207), wherein each function menu 180 includes a plurality of parameter setting items 181 and message prompt windows 182. Finally, the parameter values of the setup option of the BIOS linked to the selected guide icon 170 are adjust and set through the function menus 180 (S209).

Moreover, when the guide icon 170 is selected, a return icon 190 of the parameter setting interface 10 is also displayed on the second layer 112 of the 2D screen 110 as a switch between the first and the second layers 111, 112 of the 2D screen 110. With the return icon 190, the user may select to adjust or set the parameter values related to the BIOS either by the 3D icon 120 or the guide icons 170 optionally. Particularly, when the system 20 for parameter configuration is provided with multiple BIOSs, the 3D icon 120 and the guide icons 170 can be linked to different BIOSs. Thus, each of the BIOSs has its individual parameter setting.

In this way, after the parameter values of the BIOS is adjusted and set by the function menu 180, the user can select and click the return icon 190 by the input device such as mouse or keyboard, or touch the return icon 190 on the touch panel of the display unit 210 by finger to switch the 2D screen 110 from the second layer 112 to the first layer 111 for hiding the function menus 180 and returning the 2D screen 110 to the initial state where the second layer 112 is superimposed on a side of the first layer 111, while the 3D icon 120 and the guide icons 170 are displayed on the 2D screen 110 at the same time.

Figure 12:
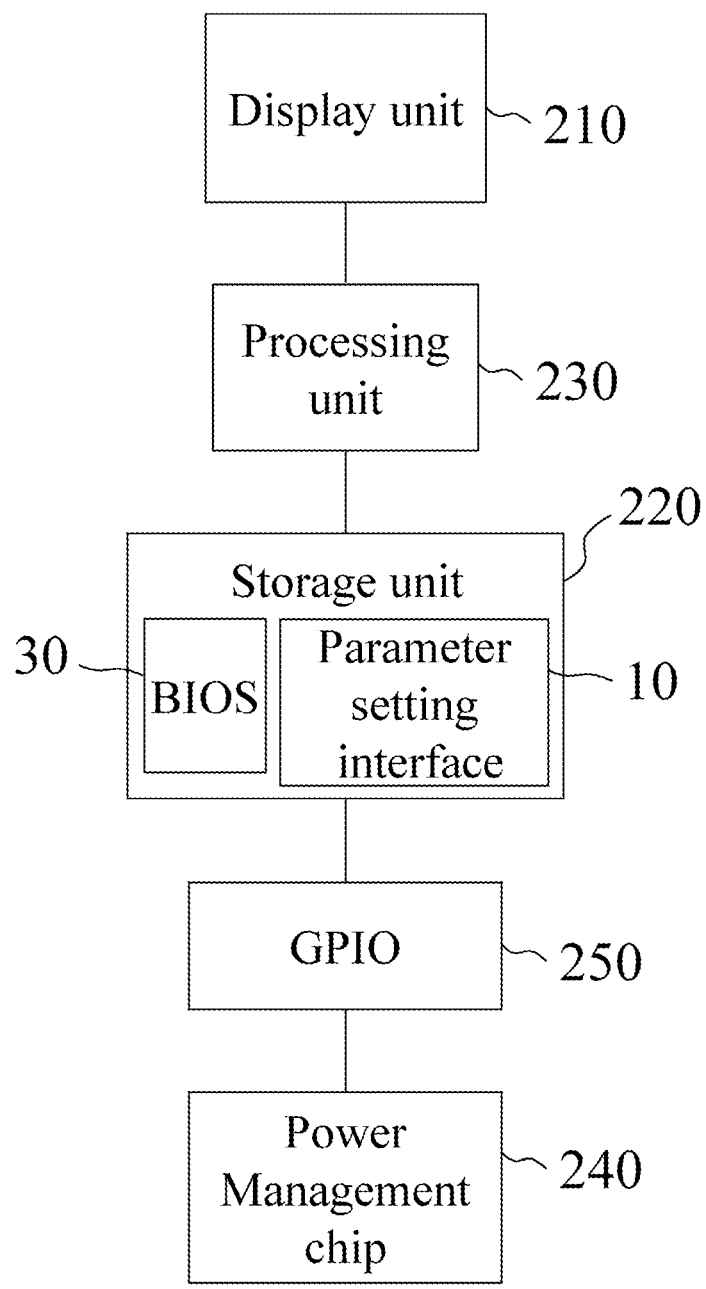
FIG. 12 is a diagram of a system for parameter configuration according to a third embodiment of the present invention.
Figure 13:
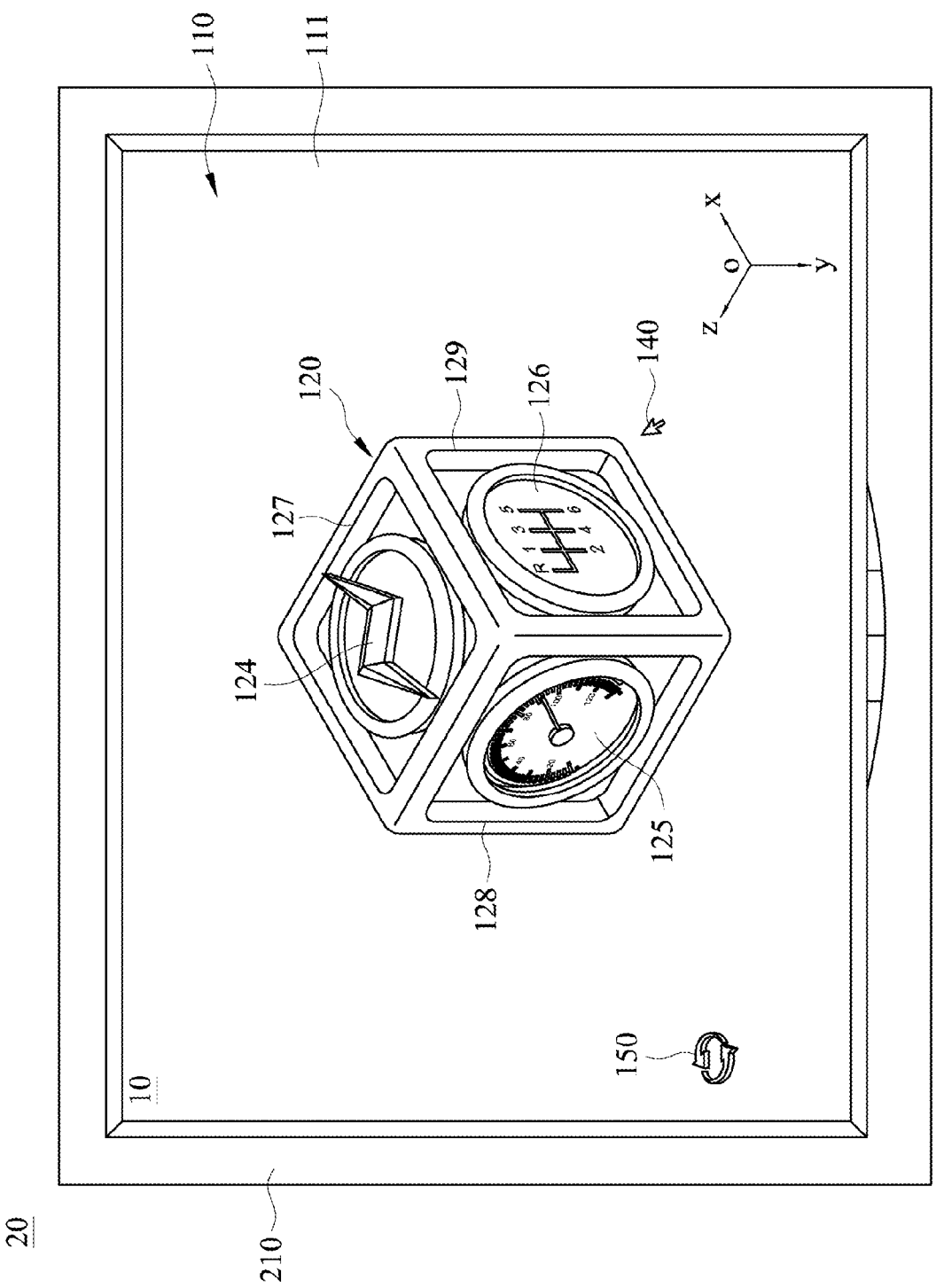
FIGS. 13-16 are exemplary state diagrams for using the system for parameter configuration to setup parameters according to the third embodiment of the present invention.

In addition, in the second embodiment of the present invention, when the plurality of the guide icons 170 are selected, the guide icons 170 defined with x-axis, y-axis and z-axis may be displayed on the 2D screen 110 in 3D mode, as shown in FIGS. 12-13. It is to be noted that the parameter setting interface 10 of the present invention may be but not limited to apply to parameter setup of the power management of the computer apparatus.

Referring to FIGS. 12-16, in the third embodiment of the present invention, a system 20 for parameter configuration includes a display unit 210, a storage unit 220, a processing unit 230 and a power management chip 240 that are electrically connected to each other, and a BIOS having a plurality of setup options and a parameter setting interface 10 are stored in the storage unit 220.

The parameter setting interface 10 comprises a 2D screen 110, a 3D icon 120 and a plurality of parameter setting menus 130. The 2D screen 110 includes a first layer 111 and a second layer 112, and the first layer 111 covers the second layer 112 normally. The 3D icon 120 is arranged on the first layer 111 of the 2D screen 110 and defined with an x-axis X, a y-axis Y, and a z-axis Z which are intersecting with a point O, and a first surface 127 between the x-axis X and the z-axis Z, a second surface 128 between the y-axis Y and the z-axis Z, and a third surface 129 between the x-axis X and the y-axis Y. Furthermore, the 3D icon 120 includes a first object image 124 arranged on the first surface 127, a second object image 125 arranged on the second surface 128 and a third object image 126 arranged on the third surface 129, such that the 3D icon 120 is displayed on the 2D screen 20 with 3D geometry such as column, prism, pyramid, hexahedron, cube or other regular or irregular 3D polygons.

Referring to FIGS. 12-16, the plurality of the parameter setting menus 130 of the parameter setting interface 10 are linked, but not limited, to a power management setup option of the setup options of the BIOS 30, and the plurality of the parameter setting menus 130 also linked to the plurality of the object images of the 3D icon 120 respectively. The plurality of the parameter setting menus 130 includes a voltage setting menu 132 linked to the first object image 124 of the 3D icon 120, a frequency setting menu 133 linked to the second object image 125 of the 3D icon 120, and a phase setting menu 134 linked to the third object image 126 of the 3D icon 120, wherein when one of the plurality of the object images is selected, one of the parameter setting menus 130 corresponding to the selected object image is displayed on the second layer 112 and covers the first layer 111 of the 2D screen 110.

In addition, each of parameter setting menus 130 further includes a plurality of parameter setting items 131, for example, the parameter setting items 131 of the voltage setting menu 132 includes voltage response, load line calibration, and over voltage protection; the parameter setting items 131 of the frequency setting menu 133 includes CPU pulse width modulation (PWM) frequency, terminal voltage (VTT) PWM frequency, internal model control (IMC) PWM frequency, double data rate (DDR) (A/B) PWM frequency and DDR (C/D) PWM frequency; and the parameter setting items 131 of the phase setting menu 134 includes CPU phase control, over current protection, and PWM thermal protection. However, it is to be noted that the above items is only illustrative and the invention is not limited thereto.

Referring to FIGS. 12-17, in operation, firstly, the BIOS 30 is executed and calling the parameter setting interface 10 is called by the processing unit 230 (S300), and then, the 2D screen 110 of the parameter setting interface 10 is displayed on the display unit 210 of the system 20 for parameter configuration (S301); next, the 3D icon 120 of the parameter setting interface 10 is displayed on the 2D screen 110 (S303), for the user to select the object images as desired through the parameter setting menus 130 with 3D graphic interface. In addition, a cursor 140 is optionally displaying on the 2D screen 20 for moving on the 2D screen 20 and selecting an object on the 2D screen 20, such that the first, second or third object images 124, 125, 126 is capable of selecting and clicking using the cursor 140. It is understood that when the display unit 210 of the system 20 for parameter configuration is a touch panel, the 3D icon 120 can be selected or clicked by a finger or stylus directly rather than the cursor 140.

Next, the user can select the first, second or third object images 124, 125, 126 of the 3D icon 140 as desired by the cursor 140 (S305), for example, continuous-click the desired object image twice, after that, the second layer 112 of the 2D screen 110 covers the first layer 111, and one the plurality of the parameter setting menus 130 corresponding to the selected object image is displayed on the second layer 112 of the 2D screen 110 (S307).

Figure 14:
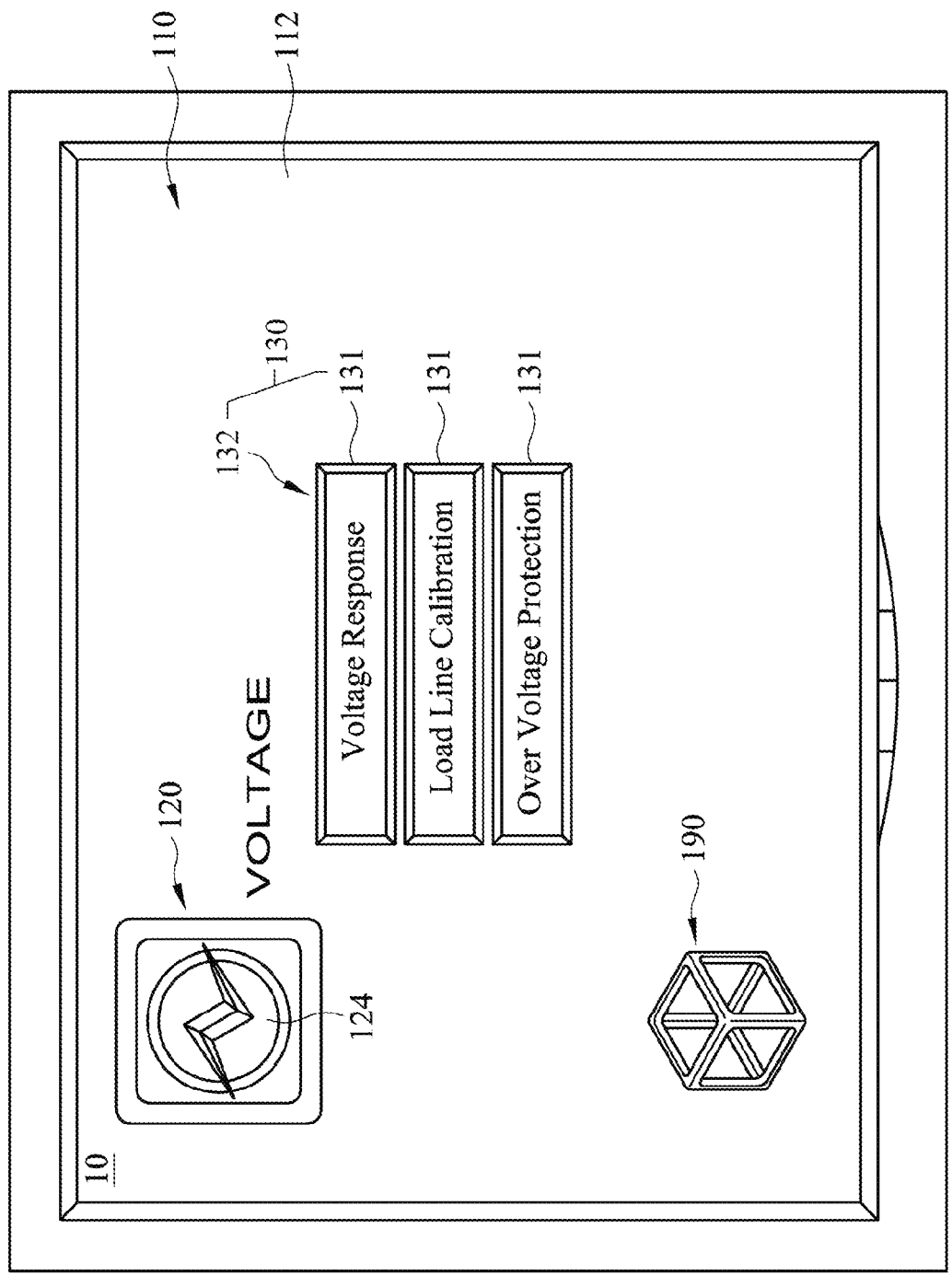
Figure 15:
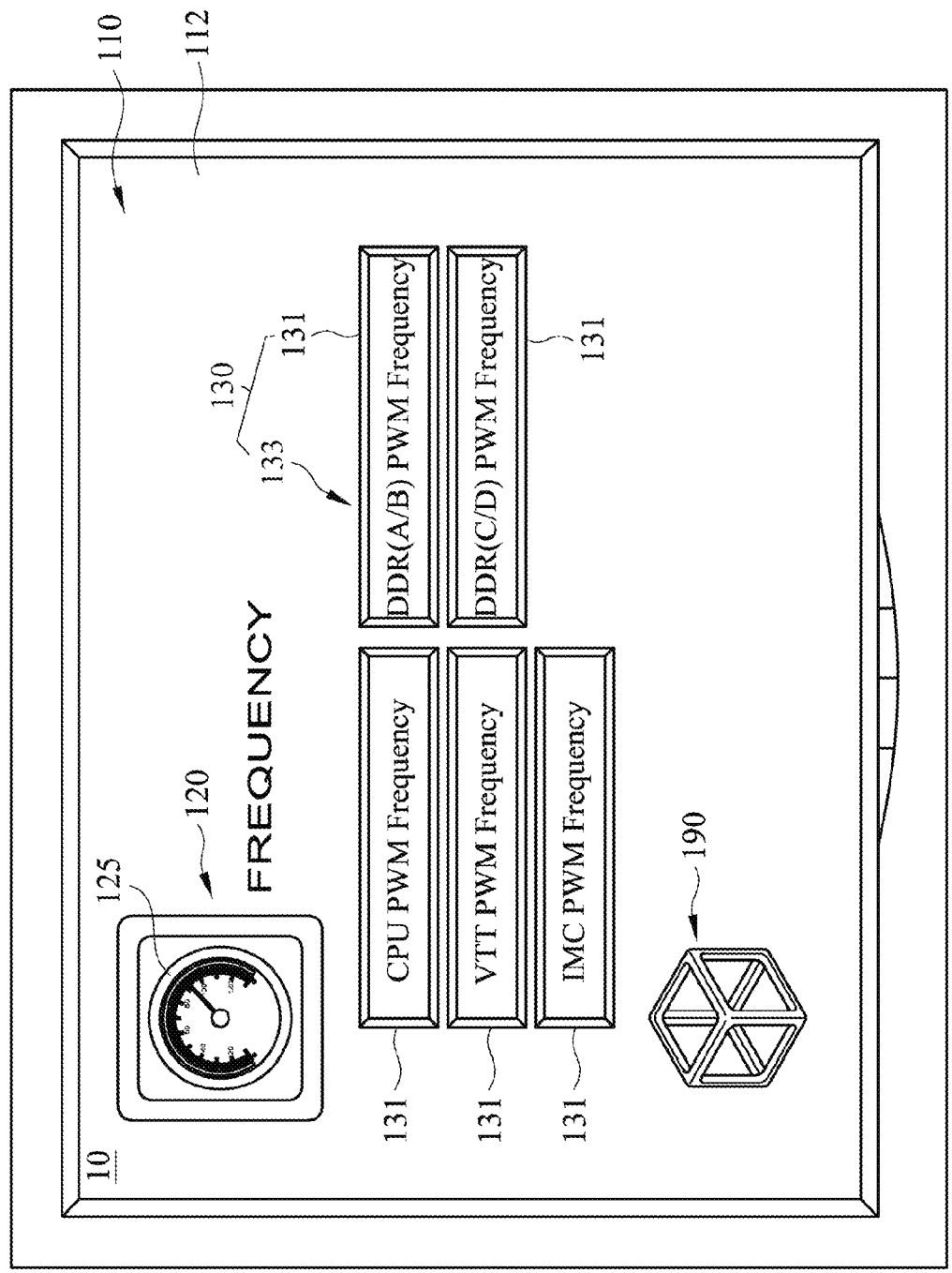
Figure 16:
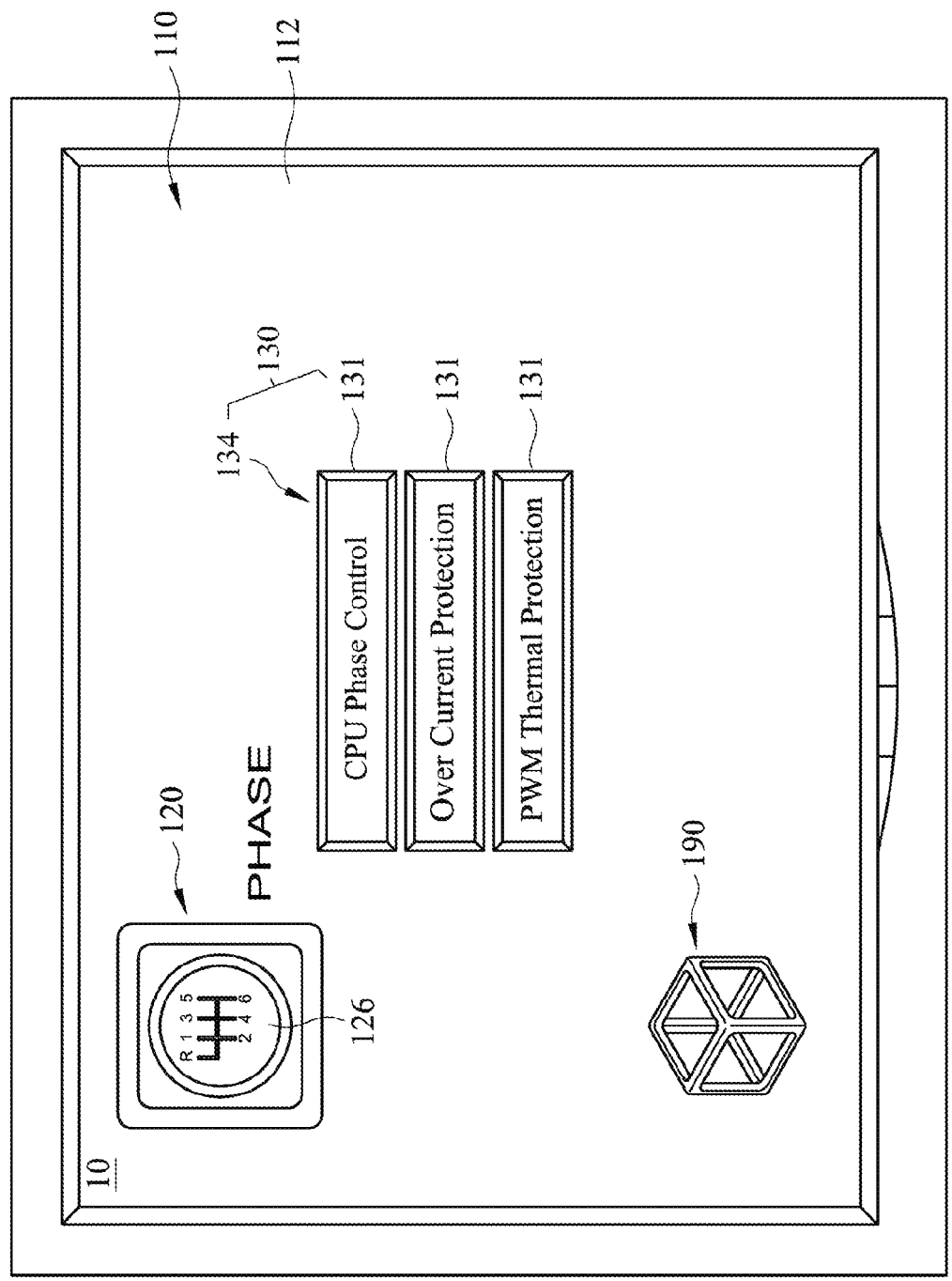
Figure 17:
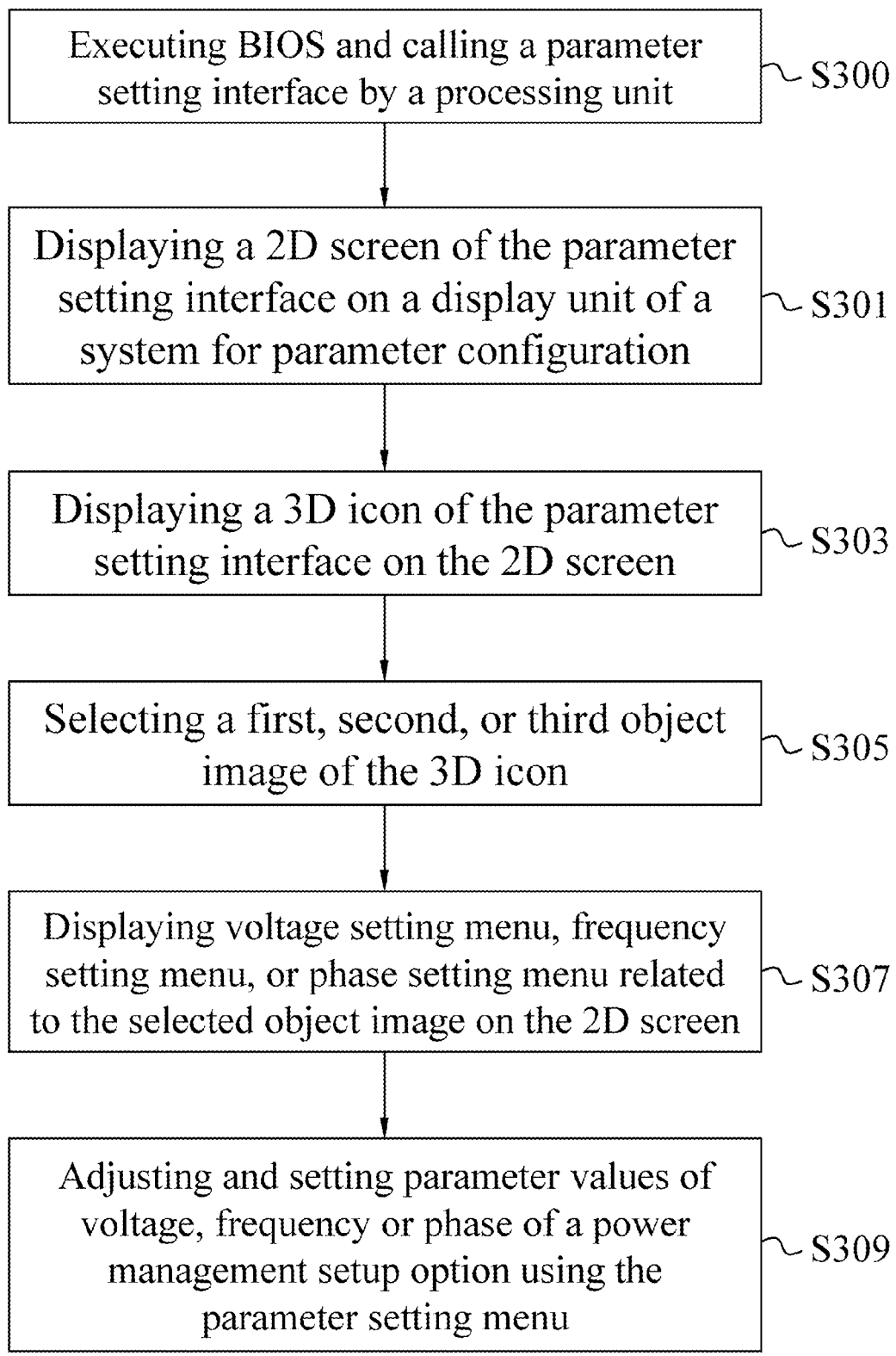
FIG. 17 is a flowchart of a method for parameter configuration according to the third embodiment of the present invention.

For example, as shown in FIGS. 13 and 14, when the user selects the first object image 124 of the 3D icon 120, the voltage setting menu 132 of the parameter setting menu 130 is displaying on the second layer 112 of the 2D screen 110, and covers the 3D icon 120 and the first layer 111 of the 2D screen 110, for the user to adjust and setup the parameter values related to the voltage of the power management setup option of the BIOS 30 through each parameter setting items 131 of the voltage setting menu 132. As shown in FIGS. 13, 15 and 16, similarly, when the second or third object image 125 or 126 of the 3D icon 120 is selected, the user can adjust and setup the parameter values related to the frequency or phase of the power management setup option of the BIOS 30 through the frequency setting menu 133 and the phase setting menu 134 which are displayed on the 2D screen 110 respectively.

Therefore, when one of the object images of the 3D icon 120 is selected, the parameters related to the power management are set or adjusted through the parameter setting menu 130 of the parameter setting interface 10 (S309). Once the parameter setting of the power management is completed successfully, the BIOS is capable of, but not limit, communicating with the power management chip 240 through a general purpose I/O (GPIO) and transmits a setting signal to the power management chip 240 via the GPIO, such that the power management chip 240 works according to the parameter settings.

In addition, when the guide icon 170 is selected, a return icon 190 of the parameter setting interface 10 is displayed on the second layer 112 of the 2D screen 110 as a switch between the first and the second layers 111, 112 of the 2D screen 110. With the return icon 190, the user is allowed to return to the initial state of the 3D icon.

It is noted that when the second layer 112 of the 2D screen 110 covers the first layer 111, the selected object image of the 3D icon 120 is also displayed on the second layer 112 of the 2D screen 110, for example, when the first object image 124 of the 3D icon 120 is selected on the first layer 111 of the 2D screen 110, the 3D icon rotates (or turns) and shrinks, and then displayed on the second layer 112 of the 2D screen 110 in 2D mode. Alternatively, the user can also return the parameter setting interface 10 to the initial state for displaying the 3D icon 120 by selecting the object image of the 3D icon 120 displayed on the second layer 112 of the 2D screen 110, such that the return icon 190 can be omitted from the parameter setting interface 10.

Figure 18:
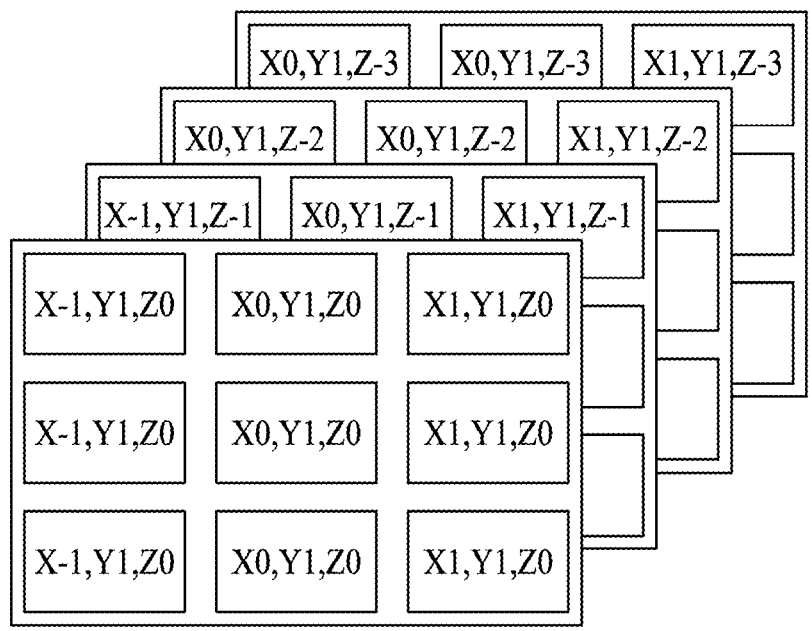
FIG. 18 is a diagram of a database having plural object images with different three dimensional coordinate according to the third embodiment of the present invention.

Moreover, as mentioned above, the 3D icon 120 is capable of rotating around x-axis X, y-axis Y, or z-axis Z or rotating by 360° freely on the 2D screen 110 using the cursor 140. As shown in FIGS. 13 and 18, the method for rotating 3D icon 120 may be but not limited to render the object images of the 3D icon 120 according to a 3D coordinate of the 3D icon 120 by software installed in the system 20 for parameter configuration, and stores all of the graphs of the object images with file names of combination of x(n), y(n), and z(n) into the storage unit 220 such as a hard disk or memory of the system 20 for parameter configuration. Also, an instruction set of the cursor is installed in the BIOS and program set such as 3D software program set stored in the system 20 for parameter configuration, and defined that when the cursor 140 moves on the 2D screen 110, the BIOS and the program set will call the object images which are corresponding to relative x-y coordinates.

For example, when the cursor 140 moves one pixel to the left, the program set will call the object image with the file name of (x-1, y0, z0), and when the cursor 140 moves two pixels to the right and down respectively, the program set will call the object image with the file name of (x2, y-2, z0). In addition, it could be set an operation mode of the input device corresponding to the z-axis Z, for example, setting a scrolling mode of a scroll wheel of the mouse to call the object images which are relative to a pixel transformation of the z-axis Z. In this way, the 3D icon 120 of the parameter setting interface 10 is capable of representing the 3D effect of the rotation by rendering the object images with different coordinates by the software to make a database and defining the coordinates of the cursor 140 to call the relative object images from the database.

As stated above, the present invention is advantageous in that the parameter setting interface provides an intuitive human-computer interface for the user by representing a stereoscopic graph of the 3D icon on the 2D screen, such that the user can not only select one of the desired items to setup parameters by visual perception during a short period of time but also save much more time in setting parameters. Also, the parameter setting interface provides a friendly and concise operation mode, because the 3D icon of the parameter setting interface transforms a text interface to stereoscopic graphs, thereby facilitating effectively the parameter setup for the novice at the computer.

From the above description of the invention, it is manifest that various techniques can be used for implementing the concepts of the invention without departing from the scope thereof. Moreover, while the invention has been described with specific reference to certain embodiments, a person of ordinary skills in the art would recognize that changes can be made in form and detail without departing from the spirit and the scope of the invention. The described embodiments are to be considered in all respects as illustrative and not restrictive. It is intended that the scope of the invention is defined by the appended claims.

What is claimed is:

1. A method for parameter configuration adapted to a system for parameter configuration, comprising steps of:
   executing a basic input and output system (BIOS) and calling a parameter setting interface by a processing unit;
   displaying a two-dimensional (2D) screen of the parameter setting interface on a display unit of the system for parameter configuration;
   displaying a three-dimensional (3D) icon of the parameter setting interface on the 2D screen, wherein the 3D icon is defined by an x-axis, y-axis, and z-axis intersecting at a point and comprises a circuit board image and a plurality of electronic element images;
   displaying the circuit board image between the x-axis and the z-axis of the 3D icon;
   displaying the electronic element images on the circuit board image, the plurality of the electronic element images being distributed between the x-axis and the z-axis, and superimposing the circuit board image along the y-axis;
   selecting one of the plurality of the electronic element images of the 3D icon;
   displaying a parameter setting menu linked to the selected electronic element image and one of a plurality of setup options of the BIOS on the 2D screen of the parameter setting interface; and
   adjusting a parameter value of the linked setup option of the BIOS through the parameter setting menu of the parameter setting interface.

2. The method according to claim 1, wherein the step of selecting one of the plurality of the electronic element images comprises following steps:
   moving a cursor of the parameter setting interface to the plurality of the electronic element images; and
   selecting the one of the plurality of the electronic element images using the cursor.

3. The method according to claim 1, further comprising a step of rotating the 3D icon on the 2D screen around the x-axis, y-axis, or z-axis.

4. The method according to claim 1, wherein the 3D icon is displayed on a first layer of the 2D screen and the parameter setting menu is displayed on a second layer of the 2D screen, wherein the one setup option of the BIOS is a power management setup option, and the parameter setting menu is linked to voltage setting menu, frequency setting menu or phase setting menu of the power management setup option, wherein the 3D icon further comprises a first object image, a second object image, and a third object image, and when the one of the first object image, the second object image, and the third object image is selected, the second layer of the 2D screen overlays the first layer of the 2D screen.

5. The method according to claim 4, wherein the step of displaying the 3D icon on the 2D screen comprises following steps:
   displaying the first object image on a first surface located between the x-axis and the z-axis defining the 3D icon, in which the first object image is linked to the voltage setting menu;
   displaying the second object image on a second surface located between the y-axis and the z-axis defining the 3D icon, in which the second object image is linked to the frequency setting menu; and
   displaying the third object image on a third surface located between the x-axis and the y-axis defining the 3D icon, in which the third object image is linked to the phase setting menu.

6. The method according to claim 4, wherein when the parameter setting menu is displayed on the second layer of the 2D screen, the one object image selected from the first object image, the second object image, and the third object image is also displayed on the second layer of the 2D screen.

7. The method according to claim 6, further comprising steps of:
   rotating the 3D icon and shrinking size of the 3D icon; and
   displaying the one object image selected from the first object image, the second object image, and the third object image on the second layer in 2D mode.

8. The method according to claim 4, further comprising steps of:
   displaying a return icon on the second layer of the 2D screen;
   selecting the return icon; and
   superimposing the first layer on the second layer of the 2D screen and displaying the 3D icon on the first layer of the 2D screen.

9. The method according to claim 1, further comprising steps of:
   displaying a plurality of guide icons on the 2D screen, and the plurality of the guide icons are linked to the plurality of the setup options of the BIOS;
   selecting one of the plurality of the guide icons;
   displaying a function menu on the 2D screen, the function menu corresponding to the selected guide icon; and
   adjusting a parameter value of the setup option of the BIOS linking to the selected guide icon using the function menu.

10. The method according to claim 9, wherein the 3D icon is displayed on a first layer of the 2D screen, and the plurality of the guide icons are displayed on a second layer of the 2D screen and superimposed on a side of the first layer.

11. The method according to claim 10, wherein when one of the plurality of the guide icons is selected, the second layer overlays the first layer and the function menu is displayed on the second layer of the 2D screen.

12. The method according to claim 9, further comprising steps of:
   displaying a return icon on the 2D screen;
   selecting the return icon; and
   hiding the function menu and displaying the 3D icon on the 2D screen.

13. A system for parameter configuration, comprising:
   a display unit for displaying a parameter setting interface;
   a storage unit storing a basic input and output system (BIOS) and the parameter setting interface, wherein the BIOS comprises a plurality of setup options, and the parameter setting interface comprises:
   a two-dimensional (2D) screen;

a three-dimensional (3D) icon arranged on the 2D screen and defined by an x-axis, y-axis, and z-axis intersecting at a point and comprising a circuit board image arranged between the x-axis and the z-axis and a plurality of electronic element images distributed between the x-axis and the z-axis and superimposed on the circuit board image along the y-axis of the 3D icon; and a plurality of parameter setting menus linked to the plurality of the electronic element images respectively and the plurality of the setup options of the BIOS respectively, wherein when one of the plurality of electronic element images is selected, one of the plurality of the parameter setting menus corresponding to the selected electronic element image is displayed on the 2D screen and superimposed on the 3D icon, a parameter value of the setup option of BIOS that is related to the selected electronic element image is adjusted through the displayed parameter setting menu of the parameter setting interface; and a processing unit, electrically connected to the display unit and the storage unit for executing the BIOS together with calling and displaying the parameter setting interface on the display unit.

14. The system according to claim 13, wherein the parameter setting interface further comprises a cursor displayed and moving on the 2D screen for selecting the plurality of the electronic element images and the plurality of the parameter setting menus.

15. The system according to claim 13, wherein the 3D icon is rotatable on the 2D screen around the x-axis, y-axis, or z-axis.

16. The system according to claim 13, wherein the 3D icon further comprises a first object image, a second object image, and a third object image, and the plurality of the setup options of the BIOS are selected from the group consisting of MB intelligent Tweaker setup option, system feature setup option, BIOS feature setup option, peripheral device setup option and power management setup option.

17. The system according to claim 16, wherein the 2D screen comprises a first and a second layers, the 3D icon is arranged on the first layer and superimposed normally on the second layer, and the plurality of the parameter setting menus comprise a voltage setting menu, a frequency setting menu and a phase setting menu linked to the power management setup option respectively, in which when one of the first object image, the second object image, and the third object image is selected, the voltage setting menu, the frequency setting menu and the phase setting menu are arranged on the second layer and superimposed on the first layer of the 2D screen.

18. The system according to claim 17, wherein the first object image arranged on a first surface between the x-axis and the z-axis of the 3D icon and linked to the voltage setting menu; the second object image arranged on a second surface between the y-axis and the z-axis of the 3D icon and linked to the frequency setting menu; and the third object image arranged on a third surface between the x-axis and the y-axis of the 3D icon and linked to the phase setting menu.

19. The system according to claim 17, wherein the one object image selected from the first object image, the second object image, and the third object image is also displayed on the second layer of the 2D screen.

20. The system according to claim 19, wherein the one object image selected from the first object image, the second object image, and the third object image is displayed on the second layer of the 2D screen in 2D mode.

21. The system according to claim 17, wherein the parameter setting interface further comprises a return icon arranged on the second layer of the 2D screen and linked to the 3D icon, and when the return icon is selected, the 3D icon is arranged on the first layer and superimposed on the second layer of the 2D screen.

22. The system according to claim 13, wherein the parameter setting interface further comprises a plurality of message prompt windows linked to the plurality of the electronic element images respectively, and when one of the plurality of the electronic element images is selected, one of the plurality of the message prompt windows corresponding to the selected electronic element image is displayed on the 2D screen.

23. The system according to claim 13, wherein the parameter setting interface further comprise a plurality of guide icons arranged on the 2D screen and a plurality of function menus respectively linked to the plurality of the guide icons, and when one of the plurality of the guide icons is selected, one of the plurality of the function menus corresponding to the selected guide icon is displayed on the 2D screen and covers the 3D icon.

24. The system according to claim 23, wherein the 2D screen comprises a first layer and a second layer partly superimposed on a side of the first layer, the 3D icon is arranged on the first layer, and the plurality of the guide icons are arranged on the second layer and displayed on the 2D screen with the 3D icon simultaneously, and when one of the plurality of the guide icons is selected, one of the plurality of the function menus corresponding to the selected guide icon is displayed on the second layer and covering the first layer of the 2D screen.

25. The system according to claim 24, wherein the parameter setting interface further comprises a return icon arranged on the second layer of the 2D screen and linked to the 3D icon, and when the return icon is selected, the second layer is superimposed on the first layer of the 2D screen and the 3D icon is exposed from the first layer.

26. The system according to claim 13, further comprising a power management chip connected to the BIOS electrically, the BIOS setting parameters of the power management chip using the setup options.

27. The system according to claim 26, further comprising a general purpose I/O port connected between the BIOS and the power management chip electrically, through which the BIOS transmits a setting signal to the power management chip.

* * * * *